Jan. 2, 1923. 1,440,490

L. M. PERKINS.
REGENERATION OF ALTERNATING CURRENT COMMUTATOR MOTORS.
FILED JAN. 25, 1919. 2 SHEETS-SHEET 1

WITNESSES:
H. J. Shelhamer
W. R. Coley

INVENTOR
Laurence M. Perkins
BY
Wesley G. Carr
ATTORNEY

Patented Jan. 2, 1923.

1,440,490

UNITED STATES PATENT OFFICE.

LAURENCE M. PERKINS, OF WILKINSBURG, PENNSYLVANIA, ASSIGNOR TO WESTINGHOUSE ELECTRIC & MANUFACTURING COMPANY, A CORPORATION OF PENNSYLVANIA.

REGENERATION OF ALTERNATING-CURRENT COMMUTATOR MOTORS.

Application filed January 25, 1919. Serial No. 273,082.

*To all whom it may concern:*

Be it known that I, LAURENCE M. PERKINS, a citizen of the United States, and a resident of Wilkinsburg, in the county of Allegheny and State of Pennsylvania, have invented a new and useful Improvement in Regeneration of Alternating-Current Commutator Motors, of which the following is a specification.

My invention relates to systems of control for dynamo-electric machines and particularly to the control of alternating-current commutator motors of the single-phase type during the regenerative period.

One object of my invention is to provide means for regulating the regenerative torque of a momentum-driven machine by manually operating a control device to change the phase relation of the exciting field voltage with respect to the electromotive force of the source of supply.

Another object of my invention is to provide automatic means comprising a relay device having its windings so energized from the various circuits of the motor that the power-factor thereof is maintained at a predetermined value, preferably 100%, within the prescribed limits of operation, the relay being automatically controlled to vary the voltage that is impressed upon the motor armature to maintain the armature current in the desired phase relation with the supply voltage.

A further object of my invention is to provide an auxiliary transformer device having its circuits arranged to automatically vary the phase relation of the voltage applied to the exciting field windings in such manner as to flatten the speed-torque curve of the motor, thus producing a resultant speed that is more nearly constant, to a marked degree, within certain limits, than the usual variable speed, dependent upon the load, of the alternating-current series motor.

Figure 1:
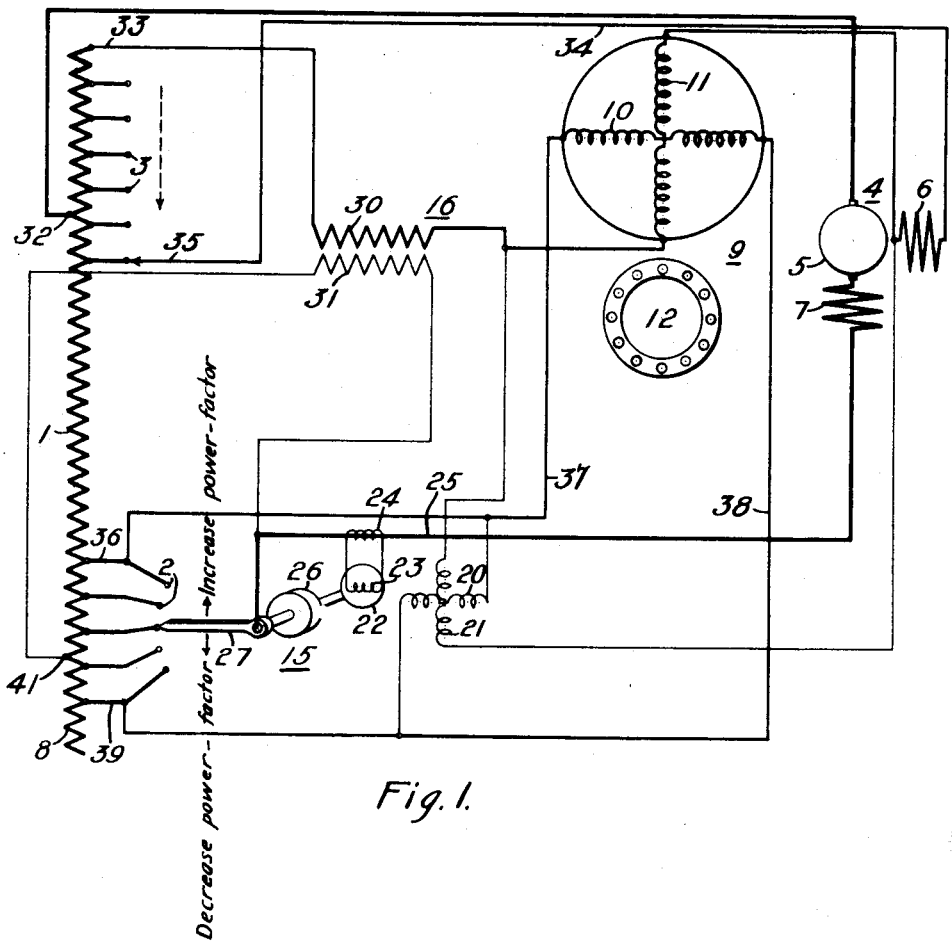
Figure 2:
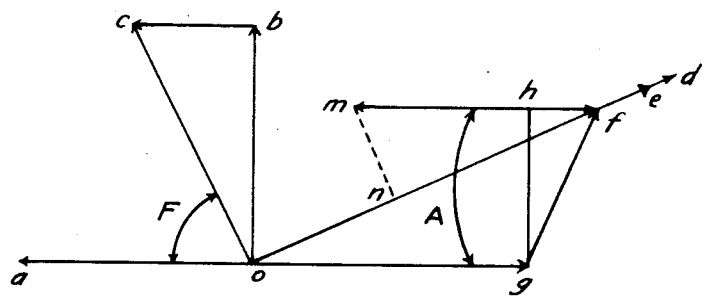
Figure 3:
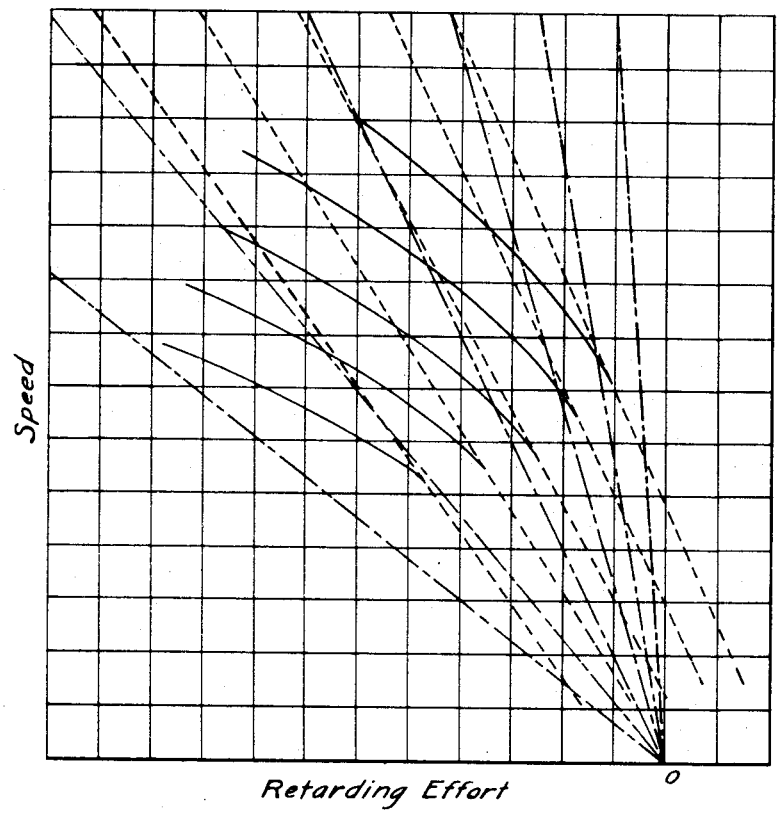
Figure 4:
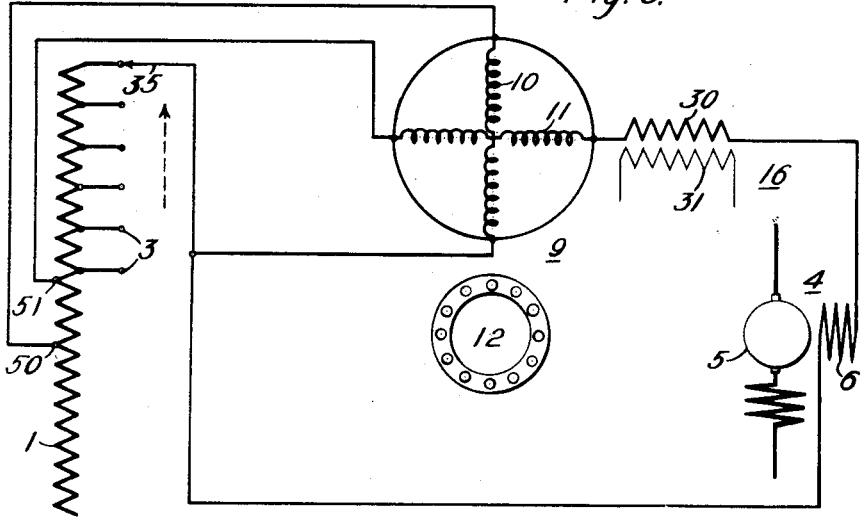

Other minor objects of my invention will become apparent from the following detailed description taken in conjunction with the accompanying drawing, wherein Fig. 1 is a diagrammatic view of a system of control organized in accordance with the present invention; Fig. 2 is a vector diagram graphically illustrating the phase relations of the various voltages and currents obtaining during the operation of the system illustrated in Fig. 1; Fig. 3 is a curve sheet setting forth graphically one feature of the present invention; and Fig. 4 is a diagrammatic view of a modification of the system shown in Fig. 1.

Referring to Fig. 1 of the drawing, the system shown comprises a suitable supply-transformer winding 1, preferably a secondary winding, having a plurality of sets of taps 2 and 3 located near the respective ends thereof; an alternating-current dynamo-electric machine 4 of the familiar single-phase series type having a commutated armature winding 5, a main or exciting field winding 6, and an auxiliary or inducing field winding 7; a rotary phase-converter 9 for effecting, in conjunction with the series machine 4, regenerative operation; a power-factor relay device 15 for automatically maintaining a constant power-factor of the machine, in a manner to be set forth; and an auxiliary field-excitation transformer 16 for the purpose of varying the exciting field voltage to provide the above-mentioned relatively flat speed-torque-characteristic curve.

If desired, an additional interpole or commutating field winding may be provided, the connection thereof being preferably through a small auto-transformer across a portion of the supply-transformer winding 1, as indicated at 8. In some instances, better operating conditions will be maintained by the use of such an interpole winding, the effect of which should preferably be controlled in accordance with the load of the regenerating machine in the manner shown and described in my copending application, Serial No. 202,313, filed November 16, 1917.

The phase-converter 9 shown is of the two-phase type having separate stator windings 10 and 11 located in quadrature relation and a rotor 12, which may be of the familiar squirrel-cage type or may be provided with direct-current excitation, in accordance with prior practice.

It will be understood, without detailed explanation, that, whenever the primary or motoring stator winding 10 of the phase-converter is energized from the supply transformer 1, a secondary voltage in quadrature relation to that of the primary winding 10 and of a value dependent upon the relative numbers of turns in the two windings is produced in the secondary or generating winding 11. By adding to the phase-converter secondary voltage a variable quadrature-related component from the supply-circuit voltage, the phase angle of the exciting field voltage with respect to the supply-circuit electromotive force is varied to permit of regenerative operation. It will be understood that, if desired, a commutator type of phase-converter may be employed.

The power-factor-relay device 15 is of the induction-motor type comprising a plurality of independent quadrature-related stator windings 20 and 21 which are energized from the phase-converter windings 10 and 11 of corresponding phase relation, and a rotor 22 having a single-phase field winding 23 which is excited from the secondary winding of a series transformer 24. The transformer 24 is energized from a conductor 25 that carries the armature current of the regenerating machine 4.

The rotor 22 of the power-factor-relay device is suitably attached to a small drum 26, or the equivalent, which is shown as provided with a conducting arm or switch 27 that is adapted to engage a plurality of the taps 2 from the supply-transformer winding 1. In actual practice, a multi-position drum, carrying a contact segment for engaging a plurality of control fingers that govern a number of unit switches, is preferably employed, but the present illustration is deemed to be sufficient for the purposes of this specification.

The following discussion will serve to explain the action of the power-factor-relay device in maintaining any predetermined power-factor of the regenerating machine 4. The rotor excitation of the relay device sets up a single-phase pulsating field flux in the rotor, which is subjected to a pulsating torque by the rotating stator flux that is provided by the quadrature-related windings 20 and 21, and the rotor will assume a position corresponding to the point of maximum torque, which occurs at the instant that the rotor flux reaches a maximum value and is in phase with the rotating stator flux.

Since the position in space of the stator flux, at the instant that the rotor flux reaches this maximum value, varies in accordance with the change of the phase angle that the armature current makes with the supply-circuit voltage, it follows that the mechanical position of the rotor likewise varies in accordance with this angle. Furthermore, since the angular relation of the rotating-stator flux is constant and is directly dependent upon the supply-circuit voltage, it will be seen that the rotor position of the power-factor-relay device will constantly indicate the phase angle between the armature current and the supply-circuit voltage or, in other words, the rotor position varies with the change of power-factor of the main machine and may be utilized in the manner indicated, namely, to actuate the switch arm 27 to increase or decrease the voltage applied to the armature 5 of the regenerating machine and thus maintain the desired phase angle or power-factor. If the power factor tends to lag behind the desired value, the power-factor-relay device is actuated to decrease the voltage applied to the armature circuit; while, on the other hand, if the power-factor becomes leading, the main-armature voltage is increased.

By varying the mechanical position of the switch arm 27, or its equivalent, with respect to the electrical relations of the stator and rotor windings of the relay device, the power-factor, which it is desired to maintain, may be pre-selected, as will be understood.

The relay device functions properly irrespective of the main-machine load, for the following reasons. The operating torque of the relay device is proportional to the maximum values of stator and rotor fluxes, and the stator flux, which is constant, can be made the predominant factor. Thus, the device assumes positions independently of the torque-opposing spring that was customarily employed in the prior art.

The auxiliary excitation transformer 16 has its secondary winding 30 connected in series relation with the secondary winding 11 of the phase-converter and with the exciting field winding 6, for a purpose to be set forth. The primary winding 31 of the auxiliary transformer is connected across a small section of the supply transformer winding 1, which section is varied in accordance with regulation of the power factor; that is, with the movements of the power-factor-relay device 15.

There is no danger of injury occurring to the relay device by reason of a heavy surge of main-armature current, since the series transformer 24 is designed to become saturated upon the occurrence of an overload current and, consequently, there is little effect upon the rotor of the relay device 15 in the case of a surge of main-armature current.

If, as an alternative, it is desired to maintain the armature current in phase with the field current, this result may be accomplished by connecting the stator windings of the relay device across the exciting-field winding and a section of the supply-transformer winding, respectively, as will be understood.

Since the type of accelerating system that is applied to the illustrated alternating-current commutator motor is immaterial with respect to the regenerative connections, I have not deemed it necessary to illustrate or describe any such system in the present instance.

Referring to the illustrated regenerative connections, therefore, it will be seen that an intermediate point 32 of the supply-transformer winding 1 is connected to one terminal of the main-armature winding 5, circuit being completed through the armature, inducing field winding 7, conductor 25, switch arm 27 of the power-factor-relay device 15 and one of the taps 2 on the lower section of the supply-transformer winding 1.

Another main circuit is established from the upper terminal 33 of the supply transformer through secondary winding 30 of the auxiliary-excitation transformer 16, secondary winding 11 of the phase converter 9, exciting field winding 6 of the regenerating machine, conductor 34, and manually movable contact member or switch 35 to one of the main-transformer-winding taps 3.

A further circuit is established from the uppermost of the transformer taps 2, numbered 36, through conductor 37, primary stator winding 10 of the phase-converter and conductor 38, to the lowermost of the transformer taps 2, designated as 39.

An auxiliary circuit is established from an intermediate point 41 of the lower section of the supply-transformer winding through the primary winding 31 of the auxiliary-excitation transformer 16 to the main-armature conductor 25. The excitation of the primary transformer winding 31 and, therefore, the voltage induced in the exciting-field-winding circuit, in addition to that provided by the phase-converter secondary winding 11 and the section of the main transformer between terminals 33 and 35, is proportional to the variations of armature voltage, as produced by the power-factor-relay device 15.

Briefly stated, therefore, the main armature is connected across an automatically variable section of the supply-transformer winding 1, while the primary stator winding 10 of the phase-converter 9 is permanently connected across a different section thereof. The exciting field winding 6 has impressed upon it the resultant of three voltages, namely, that produced by the secondary stator winding 11 of the phase converter, that furnished by the active upper section of the transformer, dependent upon the particular tap 3 that is employed, and that induced in the field-winding circuit by the auxiliary excitation transformer 16.

Referring to the vector diagram of Fig. 2, $oa$ = the supply-circuit voltage that is applied to the motoring or primary stator winding 10 of the phase-converter;

$ob$ = the quadrature-related voltage that is set up at the terminals of the secondary or generating stator winding 11 of the phase-converter;

$bc$ = the voltage across the section of the main transformer that is connected in series relation with the generating winding of the phase-converter; that is, the upper section of the transformer winding between the terminal 33 and one of the taps 3;

$oc$ = the resultant of the quadrature-related voltages $ob$ and $bc$, which is applied to the exciting field winding 6 of the regenerating machine;

$F$ = the phase angle between the exciting field voltage and the supply-circuit voltage, which angle may be varied to change the torque or tractive effort of the regenerating machines;

$od$ = the quadrature-related current that is set up in the exciting field winding by the voltage $oc$;

$oe$ = the flux produced in the machine airgap by the exciting field current $od$;

$of$ = the counter-electromotive force which is set up in the armature 5 as a result of the armature conductors cutting the flux $oe$ when the armature is driven by some external force, which, in the case of regeneration, is the momentum of the motor and the associated vehicle;

$og$ = the voltage across that section of the main transformer winding to which the armature 5 is connected;

$fg$ = the vector difference between the counter-electromotive force or generated armature voltage $of$ and the supply-circuit voltage $og$. When the armature is operatively connected to the transformer winding, the vector $fg$ represents the impedance drop in the entire circuit. This impedance drop is composed of $fh$, which equals the resistance drop in the armature circuit, the armature current $fm$ being in phase with this vector, and a reactance drop $gh$ at right angles to the resistance drop $fh$. Consequently, $fh$ = the resistance drop in the armature circuit;

$gh$ = the reactance drop in the armature circuit; and $fm$ = the total armature current.

$fn$ = the component of the armature current that is located 180° out of phase with the exciting field current $od$, and is obtained, from the total armature-current vector $fm$ by dropping a perpendicular $mn$ upon the field-current vector $od$. Since the product of armature current and field flux, taking into account, also, the angular relation thereof, gives a measure of the regenerative torque, it follows that the product of the vectors $fn$ and $oe$ at all times provides this measure; that is, it is always proportional to the regenerative torque.

$A$ = the phase angle between the armature current and the supply-circuit voltage. This angle is automatically varied by the power-factor-relay device 15 to thereby maintain a certain phase angle between the armature current vector $fm$ and the supply-circuit voltage *og*, or, in other words, to maintain a predetermined power-factor. In Fig. 2, the vectors *fm* and *og* are represented as parallel, corresponding to 100% power factor, which figure will usually be desired in actual operation.

By shifting the switch or movable contact-member 35 in the direction of the dotted arrow along the transformer taps 3, during regeneration, the vector *bc*, representing the active upper section of the transformer winding 1, is varied in length to correspondingly change the direction of the exciting field voltage vector *oc* or, in other words, to change the angle F. By so doing, the direction of the field-current vector *od* is altered accordingly and, therefore, the product of the vectors *fn* and *oe* which, as mentioned above, represents the regenerative torque, is correspondingly varied. Thus, the regenerative or braking torque of the vehicle associated with the illustrated motors may be readily controlled by the train operator by merely manually manipulating the switch 35 or its equivalent. In other words, the amount of braking torque is manually controlled by varying the angle of the exciting-field voltage with the supply-circuit voltage, which variation is accomplished by changing the component of voltage that is connected in series with the secondary phase-converter voltage. This change in torque, moreover, is effected independently of the regenerating machine speed, the power-factor relay device automatically changing the armature voltage as the speed changes.

The power-factor-relay device 15 automatically varies the voltage applied to the main-armature circuit from the main transformer, that is, changes the length of the vector *og*, which correspondingly changes the direction of the armature-current vector *fm* to alter the angle A between that current and the supply-circuit voltage (vectors *fm* and *og*), thereby controlling the power-factor of the regenerating machine in the manner previously described in detail.

The function and operation of the auxiliary excitation transformer 16 may be set forth as follows. As the speed of the regenerating machine drops during the retardation period, the counter-electromotive force or generated voltage thereof, represented by the vector *of*, and, therefore, the armature current, vector *fm*, decreases. The accompanying change of phase of that current causes the power-factor-relay device to shift the armature-circuit connection in such direction as to decrease the armature applied voltage, corresponding to the vector *og*. This change in the magnitude of vector *og* is reflected in the variation of the vector *bc*, which represents the voltage of the upper section of the transformer winding 1 that is introduced into the exciting-field-winding circuit. Such variation of the vector *bc* occurs through the agency of the auxiliary-excitation transformer 16, which impresses in the exciting-field-winding circuit a voltage in phase with the supply-transformer voltage either additively or differentially, dependent upon the position of the power-factor relay-device switch arm 27 with respect to the fixed point 41 of the main transformer, which point is connected to the primary winding 31 of the auxiliary-excitation transformer.

More specifically stated, an additional voltage is inserted in the exciting-field-winding circuit by the auxiliary transformer 16 as the switch arm 27 moves upwardly to the point 41, and a differential action occurs beyond the point 41, which corresponds to the operating condition between regeneration and acceleration. This condition usually takes place at a relatively low machine speed and may occur during the retardation period, considered as a whole; for instance, when the vehicle strikes an upgrade while regenerating, which condition may absorb the kinetic energy of the vehicle and require the application of accelerating current to maintain the operation thereof.

Referring to the curve sheet, Fig. 3, the dotted straight lines, which all converge toward the zero-speed line, represent the ordinary speed-torque characteristic curves that would be obtained during the operation of an alternating-current series motor where the power-factor-relay device and the auxiliary-excitation transformer 16 are not utilized. The dot-and-dash lines represent the speed-torque curves, all converging toward the origin O, that are produced by the power-factor-relay device alone. It will be observed that, in the case of high-speed operation in accordance with the latter curves, a relatively small variation in torque produces a relatively large speed change. However, by employing the illustrated auxiliary-excitation transformer 16, in conjunction with the power-factor-relay device 15, the various speed-torque curves may be flattened, as indicated by the solid-line curves, such variation occurring by reason of the change in the angle of the exciting field voltage, represented by the vector *oc* in Fig. 2 and, therefore, the variation of regenerative torque, as previously explained.

Referring to Fig. 4, the system shown follows the connections of Fig. 1 except as regards the phase-converter circuits, one of which is established from an intermediate point 50 of the supply transformer 1, through the primary winding 10, to movable tap-switch 35. The other phase-converter circuit is established from a second intermediate transformer point 51 through the secondary windings 11 and 30 of the phase-converter and the auxiliary excitation transformer, respectively, and the exciting field winding 6 to the switch 35.

In this case, the field winding 6 is reversed with respect to the system of Fig. 1, and the switch 35 is gradually moved toward the outer terminal of the supply-transformer winding 1, as indicated by the dotted arrow.

Consequently, the phase-converter voltage is varied simultaneously with the previously-described variation in the phase of the exciting field voltage, through the agency of the switch 35. The secondary phase-converter voltage and the supply-transformer voltage that is added thereto thus simultaneously reach maximum values, corresponding to relatively low machine speed.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with a source of supply and an alternating-current machine of the commutator type having an armature and an exciting field winding, of a phase-converter having a plurality of windings one of which is interposed between said source and said exciting field winding, and means comprising a relay device responsive to the relations between certain phase-converter-winding and certain machine-winding conditions for regulating the machine power-factor.

2. In a system of control, the combination with a source of supply and an alternating-current machine of the commutator type having an armature and an exciting field winding, of a phase-converter having a plurality of windings respectively energized from said source and connected in series circuit relation with said exciting field winding, and means comprising a relay device responsive to the voltage relations of said phase-converter windings and the current conditions of one of the machine windings, for regulating the machine power-factor.

3. In a system of control, the combination with a transformer winding and an alternating-current machine of the commutator type having an armature and an exciting field winding, of a phase-converter having a plurality of windings respectively energized from said source and connected in series circuit relation with said exciting field windings, and means comprising a relay device responsive to the voltage relations of said phase-converter windings and the current conditions of said armature for maintaining a substantially constant angular relation between the armature current and the transformer-winding voltage.

4. In a system of control, the combination with a transformer winding and an alternating-current machine of the commutator type having an armature connected across a portion of said transformer winding, and having an exciting field winding of a phase-converter provided with a plurality of quadrature-related windings respectively connected across a section of the transformer winding and in series relation with the exciting field windings, and means comprising a relay device of the motor type having a plurality of quadrature-related stator windings connected across the corresponding phase-converter windings and having a rotor winding energized in accordance with the armature current for varying the armature applied voltage to maintain a substantially constant machine power-factor.

5. In a system of control, the combination with a source of supply and an alternating-current machine of the commutator type having an armature and an exciting field winding independently connected to said source, of means for regulating the machine power-factor, an auxiliary transformer device for inductively interlinking one of the machine circuits and a portion of said source to vary the field-winding voltage in accordance with said regulation of the machine power-factor.

6. In a system of control, the combination with a source of supply and an alternating-current machine of the commutator type having an armature and an exciting field winding directly and independently connected to said source, of an auxiliary transformer device for directly inductively interlinking the field-winding circuit and only an adjustable portion of said source to materially "flatten" the speed-torque characteristic curve of the machine.

7. In a system of control, the combination with a source of supply and an alternating-current machine of the commutator type having an armature and an exciting field winding independently connected to said source, of a phase-converter winding interposed between said source and said exciting field winding, means for regulating the machine power-factor and an auxiliary transformer having its windings respectively connected in circuit with the exciting field winding and variably energized from the source in accordance with said regulation of the machine power factor.

8. In a system of control, the combination with a source of supply and an alternating-current machine of the commutator type having an armature and an exciting field winding, of a phase-converter having a plurality of windings one of which is interposed between said source and said exciting field winding, means comprising a relay device responsive to the relations between certain phase-converter-winding and certain machine-winding conditions for regulating the machine power-factor, and an auxiliary transformer device for inductively introducing into the field-winding circuit a voltage variable in accordance with the operation of said relay device.

9. In a system of control, the combination with a source of supply and an alternating-current machine of the commutator type having an armature and an exciting field winding, of a phase-converter having a plurality of windings respectively energized from said source and connected in series circuit relation with said exciting field winding, means comprising a relay device responsive to the voltage relations of said phase-converter windings and the current conditions of one of the machine windings for regulating the machine power-factor, and an auxiliary transformer device for inductively introducing into the field-winding circuit a modifying voltage responsive to the movement of said relay device to materially "flatten" the speed-torque characteristic curve of the machine.

10. In a system of control, the combination with a transformer winding and an alternating-current machine of the commutator type having an armature and an exciting field winding, of a phase-converter having a plurality of windings respectively energized from said source and connected in series circuit relation with said exciting field winding, means comprising a relay device responsive to the voltage relations of said phase-converter windings and the current conditions of said armature for maintaining a substantially constant angular relation between the armature current and the transformer-winding voltage, and an auxiliary transformer having its windings respectively connected in circuit with the exciting field winding and variably energized from the source responsive to the regulating operation of said relay device.

11. In a system of control, the combination with a source of supply and an alternating-current machine of the commutator type having an armature and an exciting field winding, of a phase-converting winding connected in series relation with said field winding, another phase-converting winding cooperating with the first-named phase-converting winding, and means for simultaneously varying the voltage of said other phase-converting winding and the angular relation of the field voltage with respect to the voltage of said source to regulate the machine torque.

12. In a system of control, the combination with a sub-divided transformer winding, and an alternating-current machine of the commutator type having an armature connected across a portion of said transformer winding and having an exciting field winding, of a phase-converter provided with a primary winding connected across a portion of the transformer winding and provided with a secondary winding connected in series relation with a section of said transformer winding and with said exciting field winding, and means for varying said transformer-winding section for varying the angular relation of the field voltage with respect to the voltage of said section to regulate the machine torque and for simultaneously varying the voltage of the phase-converter primary winding.

13. In a system of control, the combination with a source of supply and an alternating-current machine of the commutator type having an armature and an exciting field winding, of a phase-converter having a plurality of windings one of which is interposed between said source and said exciting field winding, means for regulating the machine power-factor, and an auxiliary transformer device for inductively introducing into the field-winding circuit a voltage variable in accordance with the operation of said means.

14. In a system of control, the combination with a source of supply and an alternating-current machine of the commutator type having an armature and an exciting field winding, of a phase-converter having a plurality of windings respectively energized from said source and connected in series circuit relation with said exciting field winding, means for regulating the machine power-factor, and an auxiliary transformer device for inductively introducing into the field-winding circuit a modifying voltage responsive to the operation of said means to materially "flatten" the speed-torque characteristic curve of the machine.

15. In a system of control, the combination with a transformer winding and an alternating-current machine of the commutator type having an armature and an exciting field winding, of a phase-converter having a plurality of windings respectively energized from said source and connected in series circuit relation with said exciting field winding, means for maintaining a substantially constant angular relation between the armature current and the transformer-winding voltage, and an auxiliary transformer having its windings respectively connected in circuit with the exciting field winding and variably energized from the source responsive to the regulating operation of said means.

In testimony whereof, I have hereunto subscribed my name this 14th day of Jan., 1919.

LAURENCE M. PERKINS.